United States Patent Office 3,551,293
Patented Dec. 29, 1970

3,551,293
METHOD FOR ENZYMATICALLY
HYDROLYZING STARCH
Martin Seidman and Celestian L. Royal, Decatur, Ill., assignors to A. E. Staley Manufacturing Company, Decatur, Ill., a corporation of Delaware
No Drawing. Filed Mar. 31, 1967, Ser. No. 627,329
Int. Cl. C12d 13/02
U.S. Cl. 195—31     3 Claims

ABSTRACT OF THE DISCLOSURE

A method for hydrolyzing starch with thermostable alpha-amylase involving initially pasting a starch slurry containing alpha-amylase by uniformly heating the starch mass for a short time period, e.g., about 15 seconds, at an elevated temperature at which alpha-amylase is unstable, e.g., about 215° F., and subsequently completing thinning of the resultant partially hydrolyzed starch mass at a temperature at which alpha-amylase is stable, e.g., 185° F.

---

The present invention relates to an improved method for hydrolyzing starch with enzymes and more particularly to an improved technique for thinning starch with alpha-amylase to provide liquid digests which are easily processable and in which the starch is essentially uniformly connected and completely solubilized. The present invention also relates to an improved method for preparing saccharide derivatives such as dextrose, maltose, and dextrin from starch wherein said improved enzymatic starch thinning technique is employed as a pemilinary process operation.

Widely distributed throughout nature, starch consists of granular complex mixtures of polysaccharides which are chains of glucopyranose units containing either 1–4 alpha-glucosidic, 1–6 alpha-glucosidic, or both types of linkages, the type and prominence of linkages occurring in a particular starch depending upon its biological source. Solid reducing sugars, such as dextrose and maltose, reducing sugar-containing aqueous syrups, and more complex carbohydrate mixtures such as dextrins commercially commonly are derived from starch by techniques involving gelatinizing, also commonly known as pasting, the starch and hydrolyzing the resultant paste with acid or enzyme catalysts. The hydrolysis ideally destroys starch granules present and disrupts a sufficient number of glucosidic linkages in the starch polysaccharides to reduce the viscosity of the paste and convert it to a liquid digest commonly referred to as "thinned" (also sometimes "liquefied") starch. For some product applications, the hydrolysis then is continued to further break down the thinned starch into digests containing lower molecular weight polysaccharides, simple sugars, and the like.

The extent of conversion achieved in a starch hydrolysis generally is expressed in terms of the weight percent on a dry substance basis (d.s.b.) of equivalents of a given saccharide represented in the digest obtained, e.g., the analysis being carried out on the digest solids for the total reducing sugars content by the well known Lane and Eynon-modified Fehlings test and the results being calculated and expressed as dextrose equivalent (D.E.). The degree of conversion further is often expressed directly in terms of the weight percent, d.s.b., of a given saccharide present in the digest, such as the dextrose content (D.).

In some methods the desired degree of hydrolysis is achieved with either acid or enzyme alone in one step. In others, a two-step approach is utilized in which the starting starch paste initially is digested to a thin low-viscosity liquid with either acid or alpha-amylase, and the resultant thinned starch digest then is hydrolyzed further with an enzyme specifically adapted to effect conversion to a desired saccharide or saccharide mixture. The initial thinning step in such two-step methods is designed to provide a substrate which is more readily attacked by the subsequently employed product-specific enzymes than the starting starch. Examples of product-specific enzymes employed in the second step of such processes include gluco-amylase for dextrose production; maltase for maltose production; mixtures of glucoamylase and maltase for special sweetener formulations; and dextrinase for dextrin.

Although acid catalysts are less expensive than enzymes, the use of acids in starch conversions to and beyond the thinning stage has certain disadvantages. For example, attempts to prepare starch digests of less than about 30% D.E. by straight acid hydrolysis result in digests containing residual unsolubilized starch which detracts from process economies and adds to problems attendant conventional hydrolyzate refining. Also, at starting starch slurry concentrations of over about 5% by weight, d.s.b., digestion of starch with acid results in hydrolyzates which contain considerable quantities of reversion byproducts having linkages anamalous to the starting starch carbohydrates. These reversion products reduce conversion efficiencies and furthe complicate any necessay efforts to purify and refine the digests to specified final products. The reversion byproducts characterizing starch acid digests further are resistant to attack by saccharifying enzyme systems normally employed in the second step of two-phase conversions of starch to simple sugars such as dextrose, maltose, and the like. Consequently, two-step acid-enzyme processes for producing dextrose are not capable of producing final digests having over about 95% D.E. and about 92% D. at commercial starch concentrations. Product purity requirements in such processes, moreover, usually are stringent, causing digest refining costs to be relatively high.

Accordingly, in spite of the added catalyst cost, improvement has been sought in the use of alpha-amylase as the thinning catalyst when either uniformly converted and adequately solubilized thinned starch is the desired end product or thinning is employed as a preliminary operation in two-step conversions of starch to lower molecular weight derivatives such as dextrose.

In techniques conventionally employed for thinning starch with alpha-amylase, an amount effective for thinning, e.g., from about 0.01% to about 0.5%, d.s.b., of a thermostable alpha-amylase preparation, based on the dry weight of starch present, is incorporated into an aqueous starch slurry, and the slurry is adjusted to a pH advantageous for the enzyme's hydrolyzing activity, usually from about 3.0 to about 7.5, the optimum value depending upon the particular enzyme employed. The resultant enzyme-containing slurry then is heated to temperatures sufficiently high to gelatinize and paste the starch, but not high enough to effect deactivation of the enzyme, i.e., about 170°–195° F., and the paste is held at such temperature for about 1–3 hours to allow the enzyme to effect thinning. This technique provides resultant thinned starch liquid digests which contain fewer reversion byproducts than corresponding acid-thinned starches. These digests, however, contain insoluble incompletely converted carbohydrates and rapidly retrogradable carbohydrates which are insolubilized when the digests are cooled. Once formed, the insolubilized carbohydrates are resistant to further digestion with either acids or enzymes and interfere with the refining of the initial digests and any digests subsequently prepared by additional hydrolysis. The formation of insolubilized starch in the thinning step is particularly troublesome in two-step dual-enzyme search-to-dextrose conversions since the second step of the processes employing glucoamylase is best carried out at about 120°–150° F., and cooling of the initially prepared thinned intermediate is required in the procedure. Consequently, undesirable final digest unfilterability due to the presence of insolubilized starch has continued to cloud the commercial attractiveness of the dual-enzyme dextrose process in spite of its utilization reportedly resulting in digest filtrates of about 98% D.E. and about 96% D.

Several techniques have been suggested for improving the characteristics of starch/alpha-amylase hydrolyzates. U.S. Pat. No. 3,280,006 discloses one method involving subjecting the thinned digests obtained to a subsequent high temperature treatment. Another method involves carrying out the heating for the starch pasting step in a steam injection heater without deactivating the enzyme, as described in Stärke, 17, 179–184 and Canadian Pat. No. 723,142. Although these techniques have proven successful in providing some improvement with regard to insoluble material losses and digest filterability and refinability, the problems of adapting such processes to commercial scale operations have remained substantial, particularly in dextrose preparations where ease of filterability is vital, and the art, thus, has sought additional approaches offering further improvement.

Accordingly, it is the primary object of the present invention to provide an improved process for hydrolyzing starch with enzymes.

Another object of the present invention is to provide a method for thinning starch with alpha-amylase wherein resultant hydrolyzates of substantial conversion uniformity are obtained.

An additional object of the present invention is to provide a method for thinning starch with alpha-amylase wherein starch losses due to incomplete solubilization of the starting starch and the formation of insolubilized materials are relatively low.

A further object of the present invention is to provide a method for thinning starch with alpha-amylase wherein relatively rapid viscosity reduction is achieved in the thinning of the starch mass.

Still another object of the present invention is to provide an economically feasible continuous method for thinning starch with alpha-amylase wherein thinned-starch liquid digests of satisfactory further processability and refinability are obtained.

Yet another object of the present invention is to provide a method for thinning starch with alpha-amylase to provide liquid, thinned-starch digests which are more efficiently converted by saccharifying enzymes than enzyme-thinned starch produced in prior art processes.

Another object of the present invention is to provide an improved two-step dual-enzyme method for converting starch to low molecular saccharides such as dextrose, maltose, mixtures thereof, and the like.

A particular object of the present invention is to provide an improved highly efficient dual-enzyme method for converting starch to dextrose wherein dextrose-rich crude digests ultimately are obtained which contain relatively low amounts of insolubilized carbohydrates and are filterable at commercially feasible rates.

Broadly described, the present invention consists of an improvement in the process for enzymatically hydrolyzing starch wherein thermostable alpha-amylase in an amount effective for thinning is introduced into an aqueous starch slurry in a mixing zone, the resultant slurry is passed in a continuous stream through a pasting zone in which the starch simultaneously is gelatinized by heat and partially hydrolyzed by alpha-amylase present, and the resultant starch partial hydrolyzate stream then is passed to a thinning zone wherein it is maintained at a temperature in the range at which said alpha-amylase is essentially thermostable and above the gelatinization range of said starch and further hydrolyzed by (1) alpha-amylase introduced into said starting slurry or (2) a combination of alpha-amylase introduced into said starting slurry and thermostable alpha-amylase introduced into the starch being treated subsequently to said heating of said starch in said pasting zone to provide a resultant liquid digest of thinned starch; said improvement comprising:

(a) In said pasting zone rapidly and essentially uniformly heating the entering slurry to an elevated temperature ranging up to about 235° F. and in the range at which said alpha-amylase is unstable;

(b) In said pasting zone maintaining the resultant hot starch mass at said elevated temperature for a time period requisite for the solubilizable polysaccharide content of said starch mass to be substantially solubilized, whereby a portion of said alpha-amylase is deactivated, and to provide a hot partial hydrolyzate stream, which, when cooled as hereinafter to said temperatures employed in said thinning zone, undergoes a rapid reduction in viscosity;

(c) Thereafter essentially uniformly cooling the resultant hot starch partial hydrolyzate stream to a temperature in said range employed in said thinning zone to provide a cooled starch hydrolyzate which undergoes a rapid reduction in viscosity and which is essentially free of polysaccharides derived from said solubilizable polysaccharides in said starting starch which are incapable of conversion by alpha-amylase; and (d) Maintaining said cooled hydrolyzate in said thinning zone at said thinning zone temperature to continue thinning and to provide said thinned-starch digest.

The basic method of the present invention is applicable in any process wherein thinning and solubilization of starch can be carried out or completed with alpha-amylase. The present basic technique, for example, is useful in the preparation of 6–18% D.E. complex carbohydrate solutions from unmodified starch and in the preparation of 26–30% D.E. syrups from partially acid-solubilized starch of less than about 16% D.E. A further application of the present basic technique is in so-called "dual-enzyme" processes for producing simple and complex sugars employing an initial thinning of starch with alpha-amylase and a subsequent additional hydrolysis of the intermediate thinned starch with a saccharifying enzyme. The present invention finds particular utility in such latter processes where the saccharifying enzyme is glucoamylase and the final digests consequently are dextrose-rich solutions.

By means of the present technique, valuable thinned-starch digests having improved characteristics advantageously are obtained. The liquid hydrolyzates from the thinning treatment are more uniformly converted, have relatively low viscosities, contain, upon being cooled, reduced amounts of insolubilized starch, and thus are more readily purified than corresponding hydrolyzates obtained in prior art alpha-amylase thinning methods. Due to such characteristics among others, the low D.E., complex-carbohydrate products, e.g. 6–18% D.E., which can be produced from starch in the present technique are useful as adjuvants in laundry formulations and in the formulation of various foods such as sauces. The thinned-starch digests produced by the present method, primarily due to their relatively low insolubles and reduced tendencies to retrograde and characteristic high content of polysaccharides capable of conversion by enzymes, also are excellently adapted to be further hydrolyzed with product-specific enzymes such as glucoamylase to prepare easily filterable simple-sugar-rich solutions containing relatively insignificant quantities of insolubilized starch. Another advantage is that the technique of the present method readily and inexpensively may be adapted to existing conventional starch hydrolysis equipment designs. These advantages are realized by the use of relatively short thinning times during which thinning rapidly occurs and, importantly, without a need for increasing the levels of alpha-amylase employed above those used in conventional thinning of starch with alpha-amylase. The present thinning technique, thus, provides a highly valuable means for producing improved starch hydrolyzates at increased overall process efficiencies.

The method of the invention is particularly useful in hydrolyzing unmodified granular starches. Due to its availability and low cost, corn starch constitutes the most commonly employed and the preferred starting material. The source of the starch is not critical, however, and starches obtained from sorghum, wheat, potatoes, rice, and tapioca also may be employed where desired or convenient. Modified starches that are at least partially cold water insoluble and that contain polysaccharides that can be hydrolyzed and solubilized by alpha-amplase also may be employed. Such modified starches include partially acid-converted starches, slightly heat-dextrinized starches, mildly oxidized starches, and the like. It will be apparent to those skilled in the art that in the case of some modified starches, e.g., partially acid-hydrolyzed starch digests, polysaccharide derivatives are present in the starting starches which are not capable of being hydrolyzed by alpha-amylase. It is to be understood, therefore, that the statements appearing herein with respect to solubilization and capability of conversion by alpha-amylase (and other enzymes), are intended to refer only to polysaccharides in the starting systems which are solubilizable and hydrolyzable under normal alpha-amylase thinning conditions.

The starch concentration of the starting aqueous starch slurry may vary over a relatively wide range. The technique of the invention provides improved starch digests, for example, when the starting slurry contains between about 5% and about 40% by weight starch, d.s.b. Since commercial starch hydrolyzate products usually are desired in solid or concentrated liquid form, slurries generally employed in the present technique contain at least about 25%, more preferably from about 30% to about 35%, starch to minimize overall equipment investment and operating expenditures, particularly in relation to any desired evaporative concentration. In view of the general failure of prior art thinning techniques to do so, the ability of the present technique to provide substantially completely solubilized, essentially totally enzyme convertable and easily processable starch hydrolyzates constitutes an advantageous feature of the invention. While the use of starting slurries containing over about 40%, e.g., up to about 45%, starch solids is contemplated, such slurries are not preferred since they form intermediate liquid digests which are more difficult to process continuously. At such high solids contents, then problems may be minimized by recycling previously digested starch in the process.

Any thermostable alpha-amylase preparation may be employed in the present thinning method. The term "thermostable alpha-amylase" is employed herein in the conventionally accepted sense and will be understood to refer to alpha-amylase preparations which retain 75% of their starch-liquefying activity when held for one hour at temperatures on the order 170°–190° F. under pH conditions optimum for the specific enzyme's activity. Hence, alpha-amylase preparations employed in previously used starch-thinning methods may be used in the present thinning technique. The actual source of the enzyme is not critical. Suitable alpha-amplase preparations include thermostable preparations derived from microorganisms, including bacteria, such as Bacillis subtilis and fungi, such as Aspergillus oryzae; higher plants, such as barley; and higher animal sources such as pancreas extracts. Although impure alpha-amylase enzyme preparations may be employed, purified preparations are preferred to simplify ultimate digest refining. Specific suitable alpha-amplase preparations which are commercially available include bacterial alpha-amylase preparations such as "Takamine HT–1000" and "Tenase" (Miles Laboratories), "Rhozyme H–39" (Rohm and Haas) and "Aquazyme 120" (Novo Industri) and fungal alpha-amylase preparations such as "Rhozyme 33" (Rohm and Haas). Bacterial alpha-amplase is generally more stable than alpha-amylase derived from other sources and, hence, is preferred.

The amount of alpha-amylase employed in the present invention corresponds to the proportions conventionally employed in and well known to prior art techniques for thinning starch pastes with alpha-amylase. Depending primarily upon the specific character of the enzyme and of the starting starch used, the pasting zone heater temperature and pasting zone hold time and hot partial hydrolyzate cooling rate employed, and the particular properties desired in the thinned hydrolyzate, the minimum and optimum amounts of alpha-amylase to be added to a particular starting starch slurry will vary. Given these factors and the requirements of the present process that the cooled discharge stream from the pasting zone be substantially free of polysaccharides incapable of conversion by alpha-amylase and that it displays a rapid reduction in viscosity when held at temperature employed in the thinning zone, described hereafter, desired enzyme additions for a specific embodiment may be readily determined by known methods. Embodiments using unmodified starches require slightly more thinning enzyme than previously modified and partially solubilized starches. Enzyme requirements in the starting slurry also increase somewhat for increases in the pasting zone heater temperature, pasting zone hold time, and hot partial hydrolyzate cooling rate. The presence of an activator in the starting slurry, such as calcium ions, for alpha-amylase improves the efficiency of a given enzyme system. The amount of enzyme added to the starting slurry affects the viscosity reduction rate achieved in the thinning and the total thinning time required to provide a particular desired thinned hydrolyzate. Optimum enzyme additions to the starting slurry then also depend upon feasible thinning times and equipment throughput rates. For embodiments employing concentrated slurries of unmodified starch, for example, sufficient amounts of enzyme generally should be added to starting slurry to yield a thinned starch digest having a D.E. of at least about 4% and a Brookfield viscosity at 195° F. (all viscosities given herein are measured at 20 r.p.m.—No. 2 spindle) of less than about 100 centipoises within one hour, more preferably within 15 minutes, overall thinning time. In some instances wherein the described viscosity reduction is achieved, the D.E. of the thinned digest may even range down to about 1–2% and below with suitable results. Excess amounts of enzyme do not interfere with the process and shorten hold times required in the overall process. Hence, some excess is preferred for most applications. The benfits of rapid viscosity reduction and shortened overall holding time become offset economically at a point for a given system by the added enzyme expense and, since the enzyme preparation is primarily protein in nature, the increase of impurities in the system. Accordingly, while large excesses of alpha-amylase may be employed, they generally are avoided.

Since activities of alpha-amylase preparations vary considerably, the actual concentration of alpha-amylase employed in particular embodiments more conveniently may be expressed in enzyme activity units per gram of starch on a dry weight basis. One unit of alpha-amylase as referred to herein is defined as that amount which will liquefy 20 grams of commercial grade pearl corn starch in a 10% by weight aqueous starch suspension, d.s.b., at 75° C. and a pH of 6.4 in 15 minutes to a liquid hydrolyzate of which a 50 ml. sample has a flow time of 40 seconds through a standardized 50 ml. pipette. For reference purposes, the approximate activities of representative bacterial alpha-amylase preparations for the standardized method are as follows:

| Enzyme: | Activity, units/gm. enzyme, d.s.b. |
|---|---|
| Rhozyme H–39 (Rohm and Haas) | 650 |
| Aquazyme 120 (Novo Industri) | 250 |
| Tenase (Miles Laboratories) | 275 |
| Takamine HT–1000 (Miles Laboratories) | 460 |

Expressed on this basis, the amount of alpha-amylase added to the starting starch slurry in the present method generally is at least about 0.1, and more usually in the range of from about 0.1 to about 3.0 units per gram starch, d.s.b. When unmodified starch is employed, particularly with concentrated slurries of at least 25% starch, at least about 0.20, more usually from about 0.25 to about 1.0, unit alpha-amylase per gram starch, d.s.b., is preferred to provide the more desired thinned digests, e.g., thinned digests having a D.E. in the range of from about 6 to about 18% and Brookfield viscosities (195° F.) of less than about 50 centipoises, with optimum efficiency. A particular advantageous feature of the present improved technique is that, as stated, such enzyme requirements are no greater than and correspond to those employed in prior art alpha-amylase thinning techniques which yield digests of inferior uniformity, solubilization, susceptibility to enzymatic hydrolysis and refinability.

In the present method, the starch to be thinned, alpha-amylase, and water initially are mixed in a suitable mixing zone with sufficient agitation to provide a substantially uniform aqueous starch dispersion of predetermined ingredient concentration. The mixing suitably may be carried out continuously or batch-wise in a single or plurality of mixing vessels with the ingredients being added in any convenient sequence. All of the thinning enzyme to be employed in overall thinning may be added to the starting slurry in the mixing zone. Additional amounts may be added at later stages in the process, as described hereinafter with some benefit, e.g., to further accelerate thinning and shorten total thinning time required for a given hydrolyzate preparation. When multiple-step addition of enzyme is employed, at least about 50% of the total amount of enzyme employed preferably is incorporated into the starting slurry, that amount added to the starting slurry, of course, being sufficient in itself to effect the desired degree of solubilization of the starch in the pasting zone and yield a cooled partial hydrolyzate which undergoes an autogenic rapid viscosity reduction.

The pH of the starch slurry is adjusted in the mixing zone to a value advantageous for alpha-amylase thinning activity by incorporating appropriately water-soluble acidic compounds, basic compounds or mixtures thereof, preferably providing thereby a buffered system. The value optimum for a particular enzyme can be determined by well-known procedures. For most enzyme systems having alpha-amylase activity, and in particular the above listed commercially available bacterial alpha-amylase preparations, a pH in the range of from about 5.5 to about 7.5, and more usually from about 6.2 to about 7.0, is employed. Some systems suitable for use do exist, such as that disclosed in U.S. Pat. No. 3,264,193, which display advantageous thinning activity at pHs ranging down to about 3. Any compounds conventionally employed in alpha-amylase starch hydrolysis for pH control and maintenance suitably may be employed in the present process. Substances conventionally added for pH adjustment include free mineral acids such as hydrochloric acid and phosphoric acid; free bases such as sodium hydroxide and calcium hydroxide; acidic salts such as calcium chloride; basic salts such as sodium carbonate; and mixtures thereof. In the embodiments of the technique employing slurry concentrations of at least 25%, e.g., 30% to 35% of unmodified starch d.s.b., and bacterial alpha-amylase optimum results are obtained with slurry systems having a pH in the range of from about 6.4 to about 6.8.

Calcium ion also may be, and preferably, is incorporated into the starting slurry in the mixing zone in known amounts to activate alpha-amylase. Although significant improvement is obtained by the use of calcium ion activator in the starting slurry, it will be understood the improvement is additive to that stemming from the present technique. The optimum amount of calcium ion added in particular embodiments varies depending primarily on the nature and concentration of the starting enzyme and pasting zone heater temperature and hold time at pasting zone heater temperatures. Increasing calcium ion concentrations generally are desired with enzymes of lower activities, with decreasing enzyme concentrations, with increasing pasting zone heater temperatures, and with longer pasting zone heater temperature hold times. Generally the incorporation of an amount of calcium ion to the starting slurry equivalent to a concentration of at least about 0.01% dicalcium orthophosphate based on the starch dry weight, is sufficient to provide the desired enzyme activation. For optimum thinning efficiency, the calcium ion concentration preferably is equivalent to a dicalcium orthophosphate concentration of at least about 0.025% of the starch dry weight. Excess calcium ion does not interfere with the process. Some excess is desirable to ease process control problems. The addition of excess calcium to the system, however, does not appreciably improve thinning efficiency and adds to the load on final refining equipment. Hence, calcium ion addition equivalent to an addition of about 0.1% dicalcium orthophosphate of the starting starch dry weight generally is the maximum amount utilized.

The addition of calcium may be accomplished, at least in part, by the hardness of the water employed in preparing the slurry or the compound or compounds employed in the primary pH adjustment with any remaining requirements being added via at least partially water-soluble calcium inorganic or organic compounds such as dicalcium orthophosphate, calcium carbonate, calcium lactate, calcium acetate, and the like.

Other materials known to activate alpha-amylase, such as water-soluble sodium and boron compounds, also may be added singly or in combination with calcium ion to the starting system.

After mixing is completed, the starting starch slurry containing alpha-amylase then is withdrawn from the mixing zone and passed in the form of a continuous stream through a pasting zone. The feed rate through the pasting zone may vary depending upon the capacity of the equipment. Most operations generally utilize feed rates ranging from about 1 to about 60 gallons of slurry per minute. In the pasting zone the entering slurry by means of a suitable heating device initially is rapidly and essentially uniformly heated to an elevated temperature ranging up to about 235° F. and in the range at which alpha-amylase is unstable, generally above about 200° F. and in the range of from about 205° F. to about 230° F. Temperatures in the range of from about 210° F. to about 225° F. provide the more optimally hydrolyzed thinned digests in terms of high viscosity rdeuction rate, low final viscosity, high susceptibility to alpha-amylase conversion, low insolubles, and uniformity and, hence, are preferred. Under these heating conditions the starch instantly is thoroughly and essentially uniformly pasted and simultaneously hydrolyzed in the presence of the alpha-amylase.

The heating device employed in the pasting zone suitably may effect the desired slurry temperature rise by either direct heat exchange, indirect heat exchange, or a combination thereof. The heater design, however, must be capable of essentially instantaneously and uniformly heating all of the entering starch particles to the desired elevated temperature. Particularly advantageous for use in the pasting zone are heaters of the steam injection type, exemplified by those disclosed in U.S. Pats. 2,805,955 and 3,197,337 and 3,219,483 wherein live steam is injected and mixed with the starch slurry stream in the throat of a jet. In these embodiments the pressures on the slurry and slurry feed lines and the discharge line from the jet can be varied to provide the desired pasting temperature and conditions. In the more preferred embodiments of the technique a steam injection heater is employed which is designed for and operated with a high pressure drop, e.g., at least 50%, across all steam orifices. Particularly desired for use are heaters of such designs which allow critical velocities to be achieved in the steam orifice, or orifices if a multiple orifice injector is employed, resulting in steam being injected into the slurry at a uniform rate with maximum shearing effects and heat transfer rates being attained in the steam-slurry mixing zone. Especially advantageous results are obtained, particularly with pasting zone heater temperatures above about 210° F. with at least a 60 p.s.i. pressure drop across the steam orifice, or orifices, and a back pressure on the downstream side of the mixing steam jet of 3–10 p.s.i.g.

Another suitable pasting zone heater is exemplified by that shown in U.S. Pat. No. 2,481,436 wherein the starch slurry is pumped continuously in the form of a thin agitated film through an annular chamber heated indirectly with steam. Other heaters suitable for use in the pasting zone are disclosed in U.S. Pat. 3,067,067 and 3,103,451.

The resultant hot starch stream formed in the pasting zone heating device then is maintained in the pasting zone in the described elevated temperature range for a time period long enough for the solubilizable polysaccharide content of the starch mass to become substantially completely solubilized, but sufficiently short to provide a resultant hot starch hydrolyzate stream which, when cooled to temperatures at which alpha-amylase is thermostable, is essentially free of polysaccharides, derived from the solubilizable saccharides in the starting starch, which are incapable of conversion by alpha-amylase and, which undergoes a relatively rapid reduction in viscosity. A portion, but not all, of the alpha-amylase is deactivated during this period by the extreme temperature conditions. The sacrifice in enzyme activity, however, surprisingly is beneficial. It has been found that pasting the starch under such conditions provided suitable cooling thereafter is carried out, results in a starch partial hydrolyzate which is rapidly and substantially uniformly further hydrolyzed by alpha-amylase to thinned-starch liquid digests from which starch displays a reduced tendency to retrograde. Due to the improved characteristics of the resultant partial hydrolyzates, the enzyme loss in the pasting zone does not increase the total enzyme requirements of the process over conventional levels.

The actual total time at which the hot partial hydrolyzate is maintained at alpha-amylase deactivating temperatures in the pasting zone in particular embodiments varies somewhat depending upon the conditions employed. Increases in starch and enzyme concentrations and decreases in the maximum temperature attained in the pasting zone heating device are favorable to and allow longer holding times. Holding time is also affected by whether the hot partial hydrolyzate is allowed to cool during the holding period. Cooling during holding, particularly rapid cooling to below about 212° F. when maximum temperatures above 212° F. are employed, allows longer holding periods at the enzyme-deactivating temperatures. In actual embodiments total holding times usually are in the range of from a fraction of a second, e.g., 0.1 second, resulting from essentially instantly totally cooling of the hot partial hydrolyzate after its leaving the pasting zone heating device, to about 15 minutes. The hot partial hydrolyzate should not, however, he maintained above about 212° F. for a period of longer than about four minutes and above about 200° F. for a total period of longer than about 10 minutes. In the preferred embodiments wherein the maximum temperature attained in the pasting zone by the starch mass is above 212° F., the holding times at such 212° F. and above temperatures more generally are less than about one minute and in the range of from about 0.1 second to about 30 seconds, and the total holding times at temperatures above about 200° F. are less than five minutes and in the range of from about 0.1 second to about two minutes, to minimize heat deactivation of the enzyme and balance such effects with improvement in solubilization and alpha-amylase conversion susceptibility which increase to a maximum and then decrease for a given system with increasing hold time. The more preferred pasting zone hold times for use are those which allow retention of up to and over about 30% of the enzyme added to the starting starch slurry. In embodiments employing concentrated slurries of unmodified starch, the preferred hold times are those which provide starch partial hydrolyzates which, when cooled in accordance herewith, undergo an autogenic reduction in viscosity at such a rate that a Brookfield viscosity of less than 100 centipoises (195° F.) is reached within 60 minutes, and more preferably within 15 minutes. Such partial hydrolyzates obtained from unmodified starch are further characterized by the formation, after completion of thinning as described hereafter, of thinned liquid digests from which insoluble fatty and proteinaceous impurities present in the starting starch "break" and separate spontaneously from the liquid phase when the digest is allowed to stand without cooling.

The holding of the hot starch mass stream at the elevated temperatures in the pasting zone suitably may be carried out in any convenient manner. For example, the heater itself may be designed to function also as a holding zone. The holding of the hot starch mass also may be carried out in devices such as heat exchangers wherein partial cooling thereof also is effected. In another design the holding of the hot starch mass may be carried out at least partially during the initial path of travel of the starch mass through the vessel in which thinning is completed, as described hereinafter, the vessel thus being divided into separate zones for cooling and thinning. In the preferred equipment designs employing a steam injection heater as the pasting zone heater, the holding of the hot stream preferably is carried out in a tubular member communicating with the heater and having sufficient length to provide the desired holding time. The tubular member in such designs preferably is maintained under sufficient pressure, e.g., 3–10 p.s.i.g., to ensure efficient mixing and absorption of the injected steam by the starch mass.

At the end of the short holding period at the elevated temperature in the pasting zone the resultant hot partial hydrolyzat stream then is cooled in a suitable cooling device to a temperature above the gelatinization range of said starting starch and in the range at which alpha-amylase is thermostable, said temperature being one subsequently employed in further thinning of the hydrolyzate intermediate in a thinning zone as described hereinafter. Cooling in this manner provides a starch partial hydrolyzate stream which is substantially completely solubilized and essentially free of polysaccharides incapable of conversion by alpha-amylase and which contains sufficient residual alpha-amylase that it undergoes a rapid autogenic reduction in viscosity. In embodiments employing starting concentrated slurries of unmodified starch, for example, typical partial hydrolyzates obtained at this stage of the process contain less than about 4% by weight insolubles, d.s.b., of which over 50% by weight are capable of being converted by alpha-amylase and when held at about 185–190° F., for example, display a rapid decrease in viscosity to less than about 100 centipoises in less than 60 minutes, more usually less than 15 minutes.

Additional alpha-amylase may be incorporated into the hot starch stream just prior to or during the cooling step, but any additional requirements desired to be added preferably are incorporated after cooling, as described hereafter. The actual temperature to which the hot partial hydrolyzate stream preferably is cooled in particular embodiments depends primarily upon the stability of the alpha-amylase preparation employed, but generally cooling to at least 195° F. is sufficient to provide a hydrolyzate which autogenically undergoes the desired rapid viscosity reduction. The minimum temperature to which the hot partial hydrolyzate may be cooled in accordance herewith depends primarily upon the normal gelatinization range of the starch employed. Generally temperatures in the range of from about 160° to about 195° F.

are suitable for use in avoiding, as is desired, incipient retrogradation and insolubilization of starch in the partial hydrolyzate. The hot partial hydrolyzates more preferably are cooled in the cooling step to a temperature in the range of from about 180° to about 195° F. to promote more rapid, efficient, and uniform action of the residual enzyme present.

The cooling step suitably may be carried out in any convenient manner which effects substantially uniform cooling of the pasting zone partial hydrolyzate. As stated the necessary cooling may be carried out at least in part at a relatively uniform rate in separate heat exchangers. Cooling also may be at least completed by suitable cooling means, e.g. cooling coils, positioned at the inlet end of the vessel in which thinning of the hydrolyzate is completed, as hereinafter described.

Due to the attendant simplicity of operation and the ease of process control allowed thereby, the preferred embodiments of the invention employ cooling devices which, either in stages or more preferably in one stage, and more preferably at least during the initial stage of cooling, effect the desired uniform cooling essentially instantaneously. Such cooling particularly is advantageous when the maximum temperature employed in the pasting zone is about about 212° F. The more preferred cooling is carried out by continuously discharging the hot partial hydrolyzate stream into a chamber maintained under a pressure reduced from that of the hot partial hydrolyzate, e.g. vacuum, whereby the instaneous cooling is accomplished by flashing off a portion of feed stream's water. Temperature control in the cooling is achieved by appropriately adjusting the pressure or vacuum applied to the flash chamber. Alternatively, instantaneous cooling may be effected by the use of a heat exchanger adapted with suitably indirectly-cooled rapidly rotating surfaces defining an annulus through which the initially hot stream is passed in the form of a thin agitated film. Instantaneous cooling also may be carried out by directly contacting and quenching the hot partial hydrolyzate stream in a conventional mixing-T pipe connection, quench tower or the like with a cool stream of digest liquid recycled in the process, as described hereinafter, from a thinning zone in which hydrolysis of the partial hydrolyzate is completed in the overall method. In some embodiments combinations of such rapid cooling methods are contemplated for use.

The resultant cooled partial hydrolyzate stream containing residual enzyme activity then is discharged from the pasting zone and passed to a thinning zone where thinning of the mass is completed. Any additional thinning enfiyme to be added to further accelerate thinning preferably is mixed into the cooled feed stream to the thinning zone although it is permissible in some instances to add additional alpha-amylase incrementally to the digestion mass throughout its digestion mass throughout its detention in the thinning zone.

In the thinning zone the starch mass is maintained under temperature and pH conditions advantageous for alpha-amylase activity for time periods necessary for the desired degree of thinning to be effected by the active residue of alpha-amplase incorporated into the starting starch slurry, or if additional enzyme is added in the process subsequent to the heating of the starting slurry in the pasting zone, the combination of this additional alpha-amylase and the residue of the initially added enzyme. Where necessary, maintenance of the pH at suitable levels may be carried out by continuously or intermittently metering and mixing additional pH control agent into the mixing zone. As stated above, the temperatures maintained in the thinning zone are those above the gelatinization range of the starting starch and in the range at which the alpha-amylase is thermostable. The optimum temperature to be employed in given embodiments will vary depending primarily upon the particular enzyme preparation and starting starch employed. Temperatures generally utilized are in the range of from about 160° to about 195° F. Embodiments wherein the starting slurry contains unmodified starch preferably employ temperatures in the range of from about 180° to about 195° F. to ensure completeness of solubilization and the desired viscosity reduction in realtively short periods. The thinning zone where necessary is adapted with insulation and/or heating means to achieve the requisite temperature maintenance.

The actual hold times employed in the thinning zone in particular embodiments will vary depending primarily upon the nature and concentrations of thinning enzymes and starch, the temperature, and the degree to which the conversion is desired to be carried out. When concentrated slurries of unmodified straches, e.g. over about 25% by weight starch, are treated, the reaction periods employed generally are sufficiently long to provide thinned liquid digests haveing a D.E. of at least about 4%, preferably at least about 6%, and Brookfield viscosities (195° F.) of less than about 50, perferably less than about 30 centipoises. Such results usually may be obtained at the preferred conditions set forth above by the use of a minimum holding time period in the thinning zone of at least about 30 minutes, preferably in the range of from about 40 minutes to about 1.5 hours. Three-hour thinning periods generally are fully adequate to effect more than the desired conversion and solubilization. Hence, although periods longer than about three hours are contemplated and suitable for use, they generally do not result in any significant viscosity reduction and improvement in solubilization and usually are employed only to provide a hydrolyzate thinned and hydrolyzed well beyond normal "thinning" such as a syrup having a D.E. of about 30%.

The invention embraces carrying out the hydrolysis in the thinning zone either continuously or in batch-wise fashion. The thinning zone in the preferred embodiments is designed such that the digestion mass is continuously pumped or passed by gravity through it with a minimum of channeling. The zone may be adapted with baffling, agitating elements, packing, or the like mixing aids. A single or a plurality of separate vessels may be employed. Due to the uniformity of conversions which efficiently may be obtained by their use, the more preferred thinning zones for commercial scale operations are provided by packed vertical columns or vertical columns divided by baffling into communicating chambers which are individually agitated, with flow through the columns preferably being upward and approaching plug flow. As stated above, the inlet portion of such columns suitably may be cooled and constitute at least a portion of the pasting zone cooling zone.

As stated above, some embodiments of the present technique at least partially cool the hot partial hydrolyzate stream in the pasting zone with a cool recycle quench stream withdrawn from the thinning zone. A recycle stream, where employed, preferably is incompletely digested starch, but in some applications, may be constituted at least partially by a portion of the final digest stream withdraw from the thinning zone. A recycle quench stream employed preferably should be subjected to intermediate cooling, the temperature being maintained above the gelatinization range of the starting starch, prior to being charged to the quenching and cooling zone to minimize recycle mass requirement. The weight ratio of the recycle digest stream to the hot partial hydrolyzate stream in such embodiments generally is at least about 1:1 to provide the necessary rapid and uniform cooling.

At the end of the residence period of the digestion mass in the thinning zone, a thinned-starch liquid digest is obtained. As stated above, in some embodiments of the process in which hot partial hydrolyzate formed in the pasting zone is quenched and cooled with a process recycle stream, a portion of the thinning zone product stream may be withdrawn for this purpose. The remainder of the thinning zone product is recovered and may be treated in a variety of ways, depending upon the product ultimately desired.

The crude liquid digests obtained from the thinning zone in the present method, as stated above, constitute materials which are more uniformly converted, more completely solubilized with respect to their solubilizable polysaccharide content, and more readily adapted for conversion by saccharifying enzymes such as glucoamylase, than corresponding hydrolyzates prepared in conventional alpha-amylase thinning of starch. The improvement surprisingly does not evidence itself in terms of increased conversion, e.g. increased D.E. In fact, the present method produces thinned liquid digests of lower percent D.E. than the resultant hydrolyzates produced over the same thinning periods by treatments using identical amounts of alpha-amylase at the conventional lower pasting temperatures. The improvement gained by the present invention surprisingly is displayed in terms of lower insolubles, i.e., unconverted and retrograded polysaccharides derived from the starting solubilizable starch polysaccharides, and increased processability in spite of the lower D.E. of the thinned digests. The crude thinned liquors, by virtue of their improved characteristics, may be refined without further treatment to valuable products, e.g., the low D.E. complex carbohydrate products described above.

Refining of the thinning zone crude digests may be carried out using any conventional techniques suitable to provide the desired product or products. In accordance with conventional practice, such digests usually are treated to remove insolubles, such as by centrifugation and/or filtration, then decolorized and purified by contact with absorbents, such as carbon, ion-exchange resins, and the like, and finally dehydrated, such as in vacuum evaporators, to either solid or concentrated syrup form.

In certain contemplated embodiments, the digests obtained from the thinning zone are subjected, preferably without intermediate cooling, to an additional high temperature treatment, exemplified by that described in U.S. Pat. No. 3,280,006, as part of any further processing or utilization.

This high temperature treatment, where employed, usually is carried out on the crude thinning zone digest liquid. In some instances, however, when the starting starch employed contains significant quantities of proteinaceous and fatty material impurities, such as those normally found in native unmodified starches, it may be desirable to preliminarily remove such impurities, which will be present at this stage in the process as an autogenically separable insoluble mud-like fraction, by centrifuging and the like, and then heat treating the resultant clarified digest liquid filtrate.

The heat treatment involves heating digest liquid derived from the thinning zone under pressure at a temperature in the range of from about 250° to about 350° F. for time periods sufficient to further improve product uniformity and hydrolyzate solubilization. The time periods employed in the heat treatment are regulated to avoid undesirable color formation caused by degradation of carbohydrates. Holding times at such temperatures usually range up to about 30 minutes with the holding time being decreased as temperature increases. Particularly preferred for use by virtue of a balance between color development and solubilization improvement are temperatures in the range of from about 280° to about 320° F. and holding times of from about 0.5 to about 15 minutes.

In pressure heating digest liquid derived from the thinning zone, the treatment may be carried out, as described in U.S. Pat. No. 3,280,006, after adjusting the pH of the liquid with an acid such as phosphoric acid to more acidic values at which the alpha-amylase employed is unstable, e.g., about 3–4.5 in the case of most bacterial alpha-amylase.

In other suitable embodiments, the high temperature treatment is one carried out without preliminary adjusting pH to effect deactivation of the enzyme, and is carried out in accordance with the technique described and claimed in an application filed concurrently herewith by John F. Rasche. As described therein, in these embodiments the pH of the liquid being treated is retained at the values found advantageous for alpha-amylase hydrolysis of starch and employed in the pasting and thinning zones, e.g., for most bacterial alpha-amylase from about 5.5 to about 7.5 and preferably from about 6.2 to about 7.0, and the liquid being treated is charged directly to a pressurized high temperature heating zone without any preliminary pH adjustment. If any pH adjustment is employed, it is only to adjust the system to optimum values for enzyme thinning activity. It has been found, as stated in the above-mentioned Rasche application, that conducting the high temperature pressure treatment under such conditions provides resultant hydrolyzates which are more readily refined and/or further hydrolyzed by saccharifying enzymes and the like than hydrolyzates obtained by initially adjusting the pH of the liquid to a value which substantially or totally deactivates the alpha-amylase, and then pressure heating the resulting liquor containing little or no alpha-amylase activity to low or correspondingly high temperatures.

Any conventional equipment suitable for heating starch solutions under pressure may be employed in high temperature treating the thinning zone digest liquids. The treatment may be carried out batchwise such as in an autoclave, but, due to their increased efficiencies, continuous operations are preferred. In equipment operating on the continuous principle, the liquor feed may be continuously heated such as by pumping it through a coil of tubing immersed in a hot fluid medium. Alternatively, the liquor being treated may be initially heated by indirect or direct heat exchange and then charged to a holding zone separate from the heater where the heated fluid is maintained for the requisite period at the desired elevated temperature. Specific examples of pressure heating devices suitable for use are disclosed in U.S. Pats. 2,582,198; 2,940,876; 3,101,284; 3,280,006; and the other patents mentioned above regarding pasting zone heating equipment. The more uniformly solubilized treated liquors are obtained by the use of a steam injection heater, exemplified by one of the above-described types, in combination with a holding zone defined either by a length of tubing, usually coiled to conserve space, or by a pressurized tank constructed to minimize liquid channeling.

After such heat treatment, the resultant liquid is cooled to ambient temperatures or temperatures to be employed in refining or further processing. The cooling may be slow or rapid. Rapid cooling approaches, particularly those utilizing either vacuum or atmospheric flashing, which are more readily adapted to continuous suitable processing, are preferred. In embodiments wherein the hot liquor obtained in the heat treatment is withdrawn from the process for refining, the liquor preferably is cooled to about 160°–212° F. and subjected while hot to the centrifugation, filtration, absorption, and/or other techniques utilized in the refining system employed.

In addition to embodiments for preparing useful products of low D.E., e.g. 6–18% D.E., the present method also includes embodiment wherein the crude digest liquid obtained in the thinning zone or any digest liquor recovered therefrom, as described above, is further hydrolyzed with a saccharifying enzyme selected to provide a particular carbohydrate hydrolyzate. The thinned digests are particularly adapted for use in such embodiments by virtue of being essentially free of polysaccharides, derived from solubilizable saccharides in the starting starch, which are incapable of conversion by saccharifying enzymes such as glucoamylase. In such embodiments the crude thinned starch digest or liquor obtained therefrom may be treated in any conventional manner for hydrolyzing thinned starch with the particular enzyme employed and the resultant saccharide or saccharide mixture recovered by well known refining techniques, such as those set out above. The crude digests and liquors prepared by the above described techniques, for example, may be converted to special syrups having particular sugar distributions by the saccharification techniques described in U.S. Pats. Nos. 2,201,609; 2,822,303; 2,891,869; 3,067,066; and 3,137,639, or employed to prepare uniformly converted special oligosaccharide-containing mixtures by enzymatically converting them with an enzyme preparation having strong dextrinase activity. More importantly, the thinned starch liquids prepared by the present thinning techniques from unmodified starch, particularly those given a high temperature treatment at 250°–350° F., as herein described, are especially excellently adapted to be converted by glucoamylase to provide high yields of easily recoverable dextrose.

In the aforesaid embodiments of the present method wherein the initially thinned starch subsequently is hydrolyzed by glucoamylase to dextrose-rich solutions, the particular technique employed is not critical. Typically, glucoamylase conversions of the thinned starch intermediate liquids may be carried out at from about 100°–160° F. and a pH of about 3–6 for about 36–90 hours. The glucoamylase enzyme preparation employed may be derived from widely varying microbial sources, particularly those of the Aspergillus, Clostridium, Mucor, and Rhizopus genera. To optimize conversion efficiencies, glucoamylase preparations are preferred that have been preliminarily purified to remove interfering enzymes, particularly transglucosidase. The amount of the glucoamylase preparation employed in such embodiments is not critical with the larger amounts, however, favoring shorter hydrolysis periods. An advantage of the present method, however, is that smaller amounts of glucoamylase are required to prepare glucoamylase digests yielding filtrates of a given D.E., e.g., 95% D.E., than the quantities employed in conventional acid-enzyme processes to provide such digests. Specific examples of techniques which may be employed for carrying out the glucoamylase conversion of the thinned starch intermediates to dextrose in the present method are exemplified by those shown in U.S. Pats. Nos. 2,967,804; 2,970,086; 3,067,108; 3,017,330; 3,108,928; 3,101,302; and 3,280,006.

In embodiments of the process wherein the thinned starch digest is treated with a saccharifying enzyme such as glucoamylase and the thinned intermediate is not preliminarily subjected to a high temperature pressure treatment as described above, the crude saccharified digest suitably may be subjected to such a treatment before refining to improve filterability as suggested in Cereal Chemistry, 40, No. 6, pages 618–629 (1963).

The advantages of the thinning techniques of the invention are particularly apparent in applications of the present method in dual-enzyme conversions of starch to dextrose. By the use of the present invention in such processes, dextrose yields are improved, the amount of insolubles in the final dextrose-rich digests are reduced, and the final digests are more easily and economically refined and filtered. Glucoamylase digests which may be prepared by the preferred embodiments from unmodified starch 30–35% slurries, for example, consistently display commercially acceptable layer filtration rates of up to and over 6 gal./hr./ft.$^2$ at commercial scale throughput rates, i.e. 20 gal. syrup/ft.$^2$, after being centrifuged, as is preferred, to remove autogenically separable insoluble proteinaceous and fatty impurity muds, and yield filtrates containing up to and over 99% D.E. and 97% D. Insoluble starch losses in such embodiments, moreover, are relatively low, i.e. on the order of about 1% by weight, and correspond closely to the theoretical minimum based on the starting solubilizable polysaccharide content of unmodified starches.

The invention having been described in detail, the following examples are presented to show specific embodiments thereof. It will be understood the examples are given for illustration purposes only and not by way of limitation. Unless otherwise indicated all percentages given in the examples with regard to concentration are on a dry substance weight basis. Brookfield viscosities given were measured at the indicated temperatures using a Brookfield RVT at 20 r.p.m.—No. 2 spindle.

EXAMPLE 1

This example illustrates a typical application of the present method in dual-enzyme conversion of starch to dextrose.

An aqueous 18 Bé. (60° F.) slurry of corn starch was placed in a continuously stirred vessel, and, based on the starch weight content, about 0.01% sodium bisulfite, about 0.06% dicalcium orthophosphate dihydrate, and about 0.36 unit per gram starch (about 0.144%) of a bacterial alpha-amylase enzyme preparation Aquazyme 120 (Novo Industri) were added to the agitated slurry. The pH of the slurry was adjusted to about 6.6 by the addition of soda ash. The slurry was then pumped under about 20 p.s.i.g. at a rate of about 3.8-gallon per minute through a steam injection heater (jet heater) and heated to about 215° F. with about 80 p.s.i.g. steam. The seultant paste stream was held in a tail pipe connected to the jet heater at this temperature and a pressure of about 5–7 p.s.i.g. for about 15 seconds and then discharged into a vacuum flash cooler wherein it was flashed and instantly cooled to about 195° F. The resultant substantially solubilized liquid starch mass obtained in the flash cooler then was withdrawn and six 1,500-cc. samples of it were placed separately in 2,000 cc. stainless steel beakers which were located in a water bath at about 195° F. and adapted with stirrers driven by a common shaft. The samples were held in the water bath at about 195° F. for about 45 minutes. The viscosities of the samples rapidly decreased during the first fifteen minutes to below about 100 centipoises. At the end of the 45-minue period the resultant thinned liquid samples were essentially completely solubilized, as evidenced by a negative iodine test for starch, and an autogenic separation of proteinaceous and fatty impurities. The thinned liquids had an average Brookfield viscosity of about 30 centipoises at 195° F. and an average D.E. of about 5:0%.

The thinned liquid samples were combined, the pH of the combined liquid was adjusted to about 4.0 with hydrochloric acid, and the liquid was heated in a stainless steel autoclave at about 300° F. for about 10 minutes. Steam was injected into the autoclave through its cover during the heating period. At the end of the heating period the liquid was blown out with steam through a dip leg. The first 1,500 cc. of liquid which was not diluted appreciably with condensate was collected and cooled to about 145° F. in a water bath.

About 9.5 units of refined glucoamylase per gram dry solids in the heat-treated liquid then were added to the liquid, and the mass maintained at 140° F. and a pH of 4.0 for 72 hours. The resultant glucoamylase digest was characterized by about 5% by volume insolubles (corresponded to a weight percent insolubles of about 1.5%) and a layer filtration rate for 100 cc. of digest of about 3 minutes 35 seconds. The filtrate obtained from the layer filtration of the digest had a D.E. of about 100.0% and a dextrose content of about 97.5%.

In the above description a unit of alpha-amylase is taken as defined above, and a unit of glucoamylase is taken as that amount of enzyme required to digest 0.1 gm. of starch essentially to dextrose in 48 hours at a pH of 4.0 and a temperature of 60° F. Volume percent insolubles was obtained by centrifuging, at maximum speed on a Model 65828H International Clinical laboratory centrifuge, a 15-cc. sample of the glucoamylase digest in a 15-cc. centrifuge tube for 20 minutes and reading the cubic centimeter of the white insoluble heavy phase. Weight percent insolubles was determined by precoating a Buchner funnel with 50 grams of Hyflo filter aid, filtering 250 cc. of crude digest, washing the resultant filter cake with 500 cc. water, drying the washed cake in an oven at 140°–160° F., subtracting the weight of Hyflo from the dried filter cake weight obtained, and dividing this value by the weight dry solids found in another 250 cc. sample of the crude digest. Layer filtration rate was determined by adding a 400 cc. sample of the glucoamylase digest at about 170° F. to a Buchner funnel coated with a carbon layer (layer having been applied using 23.2 grams Darco S51 carbon in 100 cc. water on 11-cm. Whatman No. 2 filter paper) and connected to a water aspirator and measuring the time required for the indicated volume of filtrate to collect in a calibrated receiving flask.

EXAMPLE II

In order to compare the results obtained by the use of the present method with those obtained by prior art thinning techniques, the dual-enzyme conversion procedure of Example I was repeated with the exception, in the pasting step, of heating the starting slurry to about 195° F. in the steam jet and without cooling, directly subjecting the resultant paste sample to continued thinning at 195° F. for 45 minutes as described in Example I.

The thinned intermediate digest had a Brookfield viscosity of about 126 centipoises (at 195° F.), a D.E. of about 6.5%, and contained a substantial amount of unsolubilized materials.

The digest obtained in the hydrolysis of the thinned starch with glucoamylase was analyzed as in Example I and was found to be characterized by 22 volume percent insolubles and for 75 cc. of collected filtrate a layer filtration time of 10 minutes. The filtrate obtained had a D.E. of 100% and a dextrose content of 98.6%.

A comparison of the results of Examples I and II demonstrates the significant improvement obtained by the use of the thinning method of the invention. The data show that even though the present method produces thinned starch intermediate digests of lower D.E. than those produced by corresponding conventional methods which do not effect deactivation of the thinning enzyme in the pasting step; the present method provides thinned intermediates which are more uniformly converted and contain a significantly lower proportion of unconverted and/or insolubilized polysaccharides, as evidenced by their increased overall susceptibility to conversion by glucoamylase and their ability to provide, when hydrolyzed by glucoamylase more easily filterable dextrose-rich digests containing significantly less insolubles.

EXAMPLES III

To demonstrate the effect of varying the pasting zone heater temperature in the present method, the duel-enzyme conversion procedure of Example I was repeated for several runs with the exception of, in the pasting zone, heating the starting slurry in the steam jet to the various temperatures listed below in Table I and determining the characteristics of the thinned digests and glucoamylase digests obtained as in Example I. For convenience the results of Examples I and II are also included.

TABLE 1

| Steam jet temp., °F. | Thinned digest (45 min. at 195° F.) | | Glucoamylase Digest | | | |
|---|---|---|---|---|---|---|
| | Brookfield viscosity, cps. | D.E., percent | D.E., percent | D., percent | Volume percent insolubles | Filtration rate min./100 cc. |
| 195 | 126 | 6.5 | 100.0 | 98.6 | 22 | a 10:00 |
| 200 | 102 | 5.9 | 99.8 | 98.6 | 7 | 5:53 |
| 210 | 41 | 5.3 | 99.9 | 98.0 | 4 | 2:54 |
| 215 | 30 | 5.0 | 100.0 | 97.5 | 5 | 3:35 |
| 220 | 34 | 4.3 | 100.0 | 99.4 | 4 | 3:35 |
| 230 | 56 | 4.0 | 97.8 | 96.9 | 11 | 10:19 | a Filtration rate shown is for 75 cc. of filtrate collected.

The data shown in Table 1 indicate that although the thinning technique of the present method results in some loss of thinning enzyme activity (exemplified by decreasing D.E. of thinned digest with increasing jet temperature), the method of the invention surprisingly produces more uniformly converted thinned digests as indicated by the glucoamylose digests prepared therefrom which contain lower amounts of insolubles and are filterable at considerably faster rates than corresponding digests obtained by the prior art process.

EXAMPLE IV

To further demonstrate the effect of varying the pasting zone heater temperature and to demonstrate the results of varying the thinning zone temperature in the present method, the dual-enzyme conversion procedure of Example III was repeated for runs employing, in the pasting step, jet heater temperatures of 200° F., 210° F., 215° F., and 230° F. with the exception of, in each run, cooling the hot stream from the jet heater to about 180° F. in the vacuum flash cooler, and completing the alpha-amylase thinning at this temperature. The results of analyses carried out on the digests as in Example I are shown below in Table 2.

TABLE 2

| Steam jet temp., °F. | Thinned digest (45 min. at 180° F.) | | Glucoamylase Digest | | | |
|---|---|---|---|---|---|---|
| | Brookfield viscosity, cps. | D.E., percent | D.E., percent | D., percent | Volume percent insolubles | Filtration rate min./100 cc. |
| 200 | 90 | 8.0 | 97 | 96.9 | 8 | 6:34 |
| 210 | 34 | 7.5 | 98.4 | 97.7 | 7 | 2:28 |
| 215 | 30 | 7.4 | 99.3 | 98.9 | 0.3 | 3:00 |
| 220 | 34 | 6.3 | 98.6 | 97.3 | 3 | 1:42 |
| 230 | 90 | 5.3 | 99.8 | 98.5 | 9 | 8:08 |

The data in Table 2 above again show that the use of the thining technique of the invention provides thinned digests of improved characteristics, as particularly evidenced by the improved filterability of glucoamylase digests obtainable therefrom.

EXAMPLE V

To demonstrate the importance of the cooling step employed in the pasting zone treatment of the starch in accordance with the present invention, the general thinning procedure of Example I, up to but not including the heat treatment at 300° F., was repeated employing jet heater temperatures of 195° F., 205° F., 215° F., and 225° F. and a subsequent appropriate heating or cooling of each of the resultant hot streams to 200° F. (all but the 195° F. jetted stream were flash cooled, the 195° F. jetted stream being heated while in the thinning breakers). In this set of experiments 0.30 unit per gram starch (0.12%) of the bacterial alpha-amylase preparation (Aquazyme 120) described in Example I was employed.

TABLE 3

| Steam jet temp., °F.: | Thinned digest D.E., percent (45 min. at 200° F.) |
|---|---|
| 195 | 2.9 |
| 205 | 1.9 |
| 215 | 0.9 |
| 225 | 0.4 |

In each case the thinned hydrolyzate digest obtained, after cooling to 140° F. was an unfilterable mass due to starch retrogradation. All of the hydrolyzates thus were totally unsuitable for further conversion to dextrose with glucoamylase.

A comparison of the results in these runs with those obtained in Example I–IV clearly manifests the advantages of using the combination of the rapid high temperature heating and cooling steps of the present method in thinning starch. The data in Table 3 indicate that at 200° F. an appreciable amount of the particular alpha-amylase employed as the thinning enzyme was deactivated. These data further indicate the extreme importance of cooling the pasting zone heater discharge stream to temperatures at which the alpha-amylase is thermostable when elevated pasting zone heater temperatures are employed in accordance with the present method.

EXAMPLE VI

This example illustrates the utilization of another alpha-amylase enzyme preparation and another mode of cooling the pasting zone hydrolyzate in the method of the present invention.

Using, in turn, jet heater temperatures in the pasting zone of 185° F., 215° F., and 230° F., the general dual-enzyme conversion procedure of Example I was repeated with the exceptions of eliminating the intermediate heat treatment at 300° F., adding to the starting starch slurry about 0.325 unit per gram starch (about 0.05%) of Rhozyme H–39 (Rohm and Haas), metering the starting slurry to the jet heater at a pressure about 22 p.s.i.g., holding the hot discharge stream from the jet heater at the resultant temperature for about 0.1 second (for the 215° F. and 230° F. run), flashing the resultant stream to the atmosphere, cooling the flashed stream obtained substantially uniformly to below 195° F. within about 15 minutes, and then holding the partial hydrolyzate at 185° F. for two hours.

The resultant glucoamylase digests obtained were analyzed for D.E., D., wt. percent insolubles, and filtration rate. In this series the filtration rate was measured by stirring 50 gm. of Hyflo filter aid into about 250 cc. of crude glucoamylase digest, and filtering the suspension at 150°–160° F. through an 11 cm. Buchner funnel fitted with two 11 cm. Whatman No. 2 filter papers and mounted on a small calibrated suction flask connected to full vacuum. Filtration time was measured from the instant the digest suspension was poured into the funnel to the time 125 cc. of filtrate collected in the suction flask. Weight percent insolubles was measured by dividing 500 grams of the glucoamylase digest in roughly equal volume samples, placing the samples in separate 250 cc. centrifuge tubes, diluting each sample with 60 ml. of hot water, centrifuging the diluted samples at 7,000 r.p.m. for 30 minutes, pouring off the supernatant liquors formed, collecting the resultant insolubles of the three samples in a single 250 cc. centrifuge tube, diluting the combined samples with 200 ml. of hot water, recentrifuging, and, after removing the resultant centrifuged solids, drying and weighing them. The percent insolubles were then calculated on the basis of 100 gm., d.s.b., of glucoamylase digest before centrifuging. The results of these tests are set forth below in Table 4.

TABLE 4

| | Glucoamylase digest | | | |
|---|---|---|---|---|
| Jet heater temp., °F. | D.E., percent | D., percent | Wt. percent insolubles | Filtration rate, sec./125 cc. |
| 185 | 97.6 | 95.1 | 7.2 | 50 |
| 215 | 97.3 | 95.2 | 1.4 | 26 |
| 230 | 98.0 | 96.7 | 0.9 | 32 |
| 240 | Viscosity 110,000 cps. after 60 minutes— discontinued | | | |

EXAMPLE VII

To determine the effect of varying the amount of thinning enzyme employed, the procedure of Example VI was repeated with the exception of adding about 0.52 unit per gram starch (about 0.08%) Rhozyme H–39 to the starting starch slurry. The resultant glucoamylase digests were analyzed as in Example VI. The results obtained are set forth in Table 5 below.

TABLE 5

| | Glucoamylase digest | | | |
|---|---|---|---|---|
| Jet heater temp., °F. | D.E., percent | D., percent | Wt. percent insolubles | Filtration rate, sec./125 cc. |
| 185 | 97.2 | 95.3 | 5.8 | 38 |
| 215 | 97.8 | 97.0 | 0.8 | 18 |
| 230 | 100.0 | 99.8 | 0.7 | 42 |
| 240 | 97.8 | 95.6 | 3.1 | 46 |

The data shown in Tables 4 and 5 again demonstrate the advantageous characteristics of the thinned hydrolyzates obtained in accordance with the method of the invention. These data taken with those shown in the earlier examples further show that with increasing enzyme concentration improvement in terms of thinned hydrolyzate uniformly can be realized by the use of pasting zone heater temperatures ranging up to about 235° F. The improvement is indicated either by decreasing amounts of insoluble materials in the thinned digests obtained which are non-susceptible to conversion by glucoamylase and/or thinned digest conversion uniformity which allows the production subsequently of readily filterable glucoamylase digests.

EXAMPLE VIII

To demonstrate the effects of varying amounts of calcium ion in the starting starch slurry, the general procedure of Example VI was repeated with the exception of substituting each in turn 0.02% and 0.08% dicalcium orthophosphate based on the starch dry weight. Analyses on the glucoamylase digests obtained were carried out as in Example VI. The results of these tests are set forth below in Table 6.

TABLE 6

| | | Glucoamylase digest | | | |
|---|---|---|---|---|---|
| CaHPO₄ addition, percent | Jet heater temp., °F. | D.E., percent | D., percent | Percent wt. insolubles | Filterability, sec./125 cc. |
| 0.02 | 200 | 98.3 | 96.2 | 2.4 | 33 |
| 0.02 | 220 | 99.1 | 97.4 | 1.0 | 23 |
| 0.02 | 230 | 98.2 | 97.0 | 1.8 | 32 |
| 0.02 | 235 | 94.1 | 89.7 | 11.1 | 103 |
| 0.08 | 200 | 98.3 | 97.7 | 1.4 | 27 |
| 0.08 | 220 | 98.1 | 96.7 | 1.1 | 22 |
| 0.08 | 230 | 97.0 | 94.2 | 0.9 | 32 |
| 0.08 | 235 | 97.3 | 95.7 | 1.9 | 61 |

The data in Table 6 taken with those in Tables 4 and 5 indicate that the improvement in thinned hydrolyzate characteristics, particularly evidenced in the improved filterability of glucoamylase digests which can be prepared therefrom, obtained in the use of the thinning technique of the invention, is not due to calcium ion, although it is further apparent from these data, the presence of calcium ion is beneficial to achieving optimum thinning efficiency.

EXAMPLE IX

This example illustrates an embodiment of the present method wherein thinning is carried out by multistep addition of thinning enzyme.

The general dual-enzyme conversion procedure of Example I was repeated for three series of runs with the exceptions that the hot stream from the jet heater was flash cooled to 190° F. and thinned at 190° F. for 45 minutes, and the bacterial alpha-amylase (Aquazyme 120) employed in the particular run was distributed between the starting slurry and the cooled pasting zone discharge stream as shown in Table 7 below. The digests were analyzed as in Example I. The results of these tests are as follows:

TABLE 7

| Enzyme addition, unit/gm. starch | | | Thinned digest | | Glucoamylase digest | |
| --- | --- | --- | --- | --- | --- | --- |
| Starting slurry conc. | Added to pasting zone discharge | Total | Brookfield viscosity, cps. | D.E., percent | Filtration rate, min./ 200 ml. | Wt., percent insolubles |
| 0.21 | 0.21 | 0.42 | 37 | 6.3 | 15:44 | 2.7 |
| 0.21 | 0.28 | 0.49 | 31 | 7.5 | 11:48 | 2.4 |
| 0.21 | 0.35 | 0.56 | 30 | 7.8 | 13:36 | 2.8 |
| 0.28 | 0.14 | 0.42 | 36 | 4.8 | 8:22 | 1.4 |
| 0.28 | 0.21 | 0.49 | 35 | 6.2 | 9:25 | 0.9 |
| 0.28 | 0.28 | 0.56 | 25 | 7.1 | 6:08 | 1.3 |
| 0.35 | 0.07 | 0.42 | 32 | 6.2 | 6:45 | 1.1 |
| 0.35 | 0.14 | 0.49 | 27 | 7.4 | 5:05 | 0.9 |
| 0.35 | 0.21 | 0.56 | 21 | 8.3 | 4:35 | 1.6 |
| 0.42 | | 0.42 | 28 | 4.7 | 6:42 | 1.0 |
| 0.42 | 0.14 | 0.56 | 20 | 7.1 | 5:03 | 1.6 |
| 0.42 | 0.28 | 0.70 | 14 | 9.1 | 3:53 | 1.2 |
| 0.56 | | 0.56 | 16 | 7.1 | 3:45 | 1.3 |
| 0.56 | 0.14 | 0.70 | 14 | 9.5 | 3:07 | 1.2 |
| 0.70 | | 0.70 | 14 | 9.6 | 3:29 | 1.3 |

The data in Table 7 surprisingly show that, although additional enzyme added subsequent to the heating step in the pasting zone in the present technique is beneficial to the production of improved thinned hydrolyzates, for a given total enzyme usage level, hydrolyzate properties are improved with increasing proportions of alpha-amylase added to the starting slurry. This result is unexpected in view of the prior art prediction of undesirable deactivation and loss of enzyme in the pasting zone at the temperatures employed in the present method. The data in Table 7 further indicate that in the present method at least 0.20, and more preferably at least about 0.25, e.g. 0.30, unit alpha-amylase per gram starch should be added to the starting slurry when concentrated slurries are employed.

EXAMPLE X

This example illustrates the effect of pasting zone temperature hold time in the method of the invention.

The general dual-enzyme procedure of Example I was repeated for a series of runs using jet heater of 205° F., 210° F., and 215° F. with the exceptions of substituting about 0.325 unit per gram starch (about 0.05%) of Rhozyme H–39 (Rohm and Haas) to the starting starch slurries at each jet heater temperature holding the resultant hot partial hydrolyzate stream at the elevated temperature for 5 seconds, 20 seconds, and 5 minutes in a tail pipe, thereafter flashing the resultant stream in a vacuum flash chamber to about 190° F., and completing thinning by holding the flashed stream at about 190° F. for two hours. Without any intermediate heat treatment, the resultant thinned digests were then converted with glucoamylase as in Example I at a pH of 4.8 and 131° F. for 72 hours. Analysis of the digests were carried out as in Example I. The results of these runs are set forth below in Table 8.

TABLE 8

| Jet heater temp., °F. | Hold time | Thinned digest viscosity, c.p. (180 min. at 190°F.) | Glucoamylase digest | | Volume percent, insolubles |
| --- | --- | --- | --- | --- | --- |
| | | | D.E., percent | D., percent | |
| 205 | 5 seconds | 20 | 98.5 | 95.1 | 4.4 |
| 210 | do | 22 | 98.9 | 98.5 | 4.9 |
| 215 | do | 20 | 99.5 | 96.6 | 2.6 |
| 205 | 20 seconds | 22 | 98.5 | 98.5 | 4.3 |
| 210 | do | 24 | 98.0 | 95.1 | 6.0 |
| 215 | do | 20 | 98.7 | 99.5 | 2.8 |
| 205 | 5 minutes | 22 | 97.5 | 98.3 | 3.5 |
| 210 | do | 32 | 99.1 | 97.5 | 5.1 |
| 215 | do | 68 | 99.5 | 98.2 | 10.7 |

The data in Table 8 show the desirability of cooling the hot partial hydrolyzate obtained in the pasting zone to temperatures below about 212° F. within about 4 minutes in practicing the method of the invention.

EXAMPLE XI

This example illustrates a typical application of the present method in the production of dextrose wherein thinning is carried out continuously.

The general dual-enzyme conversion procedure of Example I was repeated with the following exceptions: The starting slurry contained about 0.42 unit per gram starch (about 0.144%) of Aquazyme 120, about 0.28 unit per gram starting starch (about 0.096%) additional Aquazyme 120 was continuously metered as a 4% aqueous solution in-line to the discharge stream from the flash cooler, and the resultant stream, to complete thinning, was passed continuously upwardly, through a thinning zone constituted by two vertical reactor columns (24-inch diameter and 8 feet high) connected series and packed with ¾ in. Intalox porcelain saddles. In the thinning zone reactor columns the starch mass being heated was maintained at 183°–191° F. At the 3.8-gallon per minute feed rate through the system, the average detention time of the charge in the thinning zone reactors was about 75 minutes. Tracer studies indicated that the column reactor system maintained essentially all of the thinning mass at least about 45 minutes.

A discharge stream was obtained from the thinning reactors having an average Brookfield viscosity of about 12 centipoises (195° F.) and an average D.E. of about 9.7. This stream was passed continuously without any pH adjustment to a surge tank and then pumped through a second stream injection jet heater wherein it was heated to about 300° F. The resultant heated liquid stream was maintained in a coiled tailpipe attached to the heater at 60–70 p.s.i.g. for about 3–4 minutes, cooled to about 210° F. in an atmospheric flash chamber, and then centrifuged to remove fatty and proteinaceous impurities. The centrifuge liquid was then cooled to 140° F., adjusted to a pH of 4.0 with hydrochloric acid, and then hydrolyzed for 72 hours with glucoamylase as in Example I. At the end of the 72-hour conversion period a crude digest was obtained which contained an average of 1.2% by weight insolubles (analyzed as per Example I) and filtered (at about 170° F. and a pressure of about 60 p.s.i.g.) at an average rate of about 15.4 gallons/hr./ft.$^2$ for an average feed of about 25.8 gallons digest/ft.$^2$, through an 18-inch filter press precoated with 0.5 lb. Darco S51 carbon/ft.$^2$. The filtrate obtained had an average D.E. of about 99.7% and contained about 98.5% dextrose, d.s.b.

EXAMPLE XIII

This example illustrates a typical embodiment of the present method for continuously producing an essentially solubilized and starch-free low D.E. complex carbohydrate syrup.

The thinning phase of the procedure of Example XI was repeated with the following exceptions: after startup, a sample of the cooled liquid obtained after the 300° F. jet heating and atmospheric flashing steps was analyzed to determine percent D.E. The addition of 4% Aquazyme 120 enzyme solution metered into the cooled pasting zone discharge stream was then adjusted to provide a 12–18% D.E. hydrolyzate at the point in the process the described D.E. analysis was made. After the system was in equilibrium, the 12–18% D.E. liquid obtained after atmospheric flash cooling, while hot, then was adjusted to a pH of about 4.0 with hydrochloric acid, and about 2% Darco S51 carbon, d.s.b., was added. After the resultant slurry was stirred at 180°–200° F. for 30 minutes, it was filtered hot through a filter press coated with cotton twill cloth, and then evaporated under vacuum to 73.5% solids. The resultant hydrolyzate product had a D.E. of about 12–18% and a dextrose content of about 2%, d.s.b.

Further embodiments of this invention which do not depart from spirit and scope thereof, of course, will be apparent to those skilled in the art; accordingly, the foregoing is to be interpreted as illustrative only and the invention will be understood to be limited only by the scope of the appended claims.

What is claimed is:

1. In a process for enzymatically liquefying starch with thermo-stable alpha-amylase in an amount effective for thinning, and in which an aqueous starch dispersion containing thermo-stable alpha-amylase is heated at temperatures in the liquefaction range 170–195° F. to thin it to a predetermined viscosity, wherein the starch is selected from the group consisting of corn, sorghum, potato, rice, and tapioca starches, said starch raw material having a gelatinazation range below said temperatures, the improvement comprising:

as a preliminary step, first rapidly and essentially uniformly heating an aqueous slurry of granular starch to elevated temperatures in the range 205–230° F., said slurry having at least 25% solids content and having admixed therewith a thermo-stable alpha-amylase preparation with starch liquefying activity, said preparation being sufficiently thermo-stable to retain 75% of its starch liquefying activity when held for one hour at temperatures in the order of 170–190° F. under pH conditions optimum for the enzyme activity;

maintaining the slurry in said elevated temperature range of 205–230° F. for a period of time not more than four minutes, whereby not more than a portion of said admixed enzyme is deactivated and the granular starch slurry is converted to a thoroughly and essentially uniformly pasted starch dispersion.

immediately and rapidly cooling the resulting pasted starch dispersion to enzymatic liquefaction temperature in the range of 170–195°F.; and maintaining the dispersion at said enzymatic liquefaction temperature for a period of time sufficient for the viscosity to be reduced to said predetermined level.

2. The method according to claim 1 wherein granular starch slurry is heated to said elevated temperature by contacting and admixing said slurry with steam in the throat of a steam injection heater.

3. The method according to claim 1 in which at least an initial stage of the cooling of the pasted starch dispersion carried out by discharging said pasted starch dispersion from a zone of relatively high pressure to a zone of relatively low pressure in which a pressure of the water present in the pasted starch dispersion is flashed off.

References Cited

UNITED STATES PATENTS

| | | | |
|---|---|---|---|
| 3,149,049 | 9/1964 | Walkup et al. | 195—31 |
| 3,280,006 | 10/1966 | Hurst et al. | 195—31 |
| 3,378,462 | 4/1968 | Denault et al. | 195—31 |

OTHER REFERENCES

Komaki, T., et al.: Agricultural and Biological Chemistry, vol. 32, No. 7, pages 860–872 (1968).

LIONEL M. SHAPIRO, Primary Examiner